(12) United States Patent
Sano et al.

(10) Patent No.: US 8,410,215 B2
(45) Date of Patent: Apr. 2, 2013

(54) THERMOPLASTIC RESIN COMPOSITION AND MOLDED ARTICLE OBTAINED FROM THE SAME

(75) Inventors: Takuya Sano, Chuo-ku (JP); Toshiyuki Hayakawa, Chuo-ku (JP); Takeo Nakamura, Chuo-ku (JP); Teruo Aoyama, Chuo-ku (JP); Akihiko Okubo, Chuo-ku (JP); Satoshi Kura, Chuo-ku (JP)

(73) Assignee: JSR Corporation, Tokyo (JP)

( * ) Notice: Subject to any disclaimer, the term of this patent is extended or adjusted under 35 U.S.C. 154(b) by 466 days.

(21) Appl. No.: 12/438,466

(22) PCT Filed: Aug. 23, 2007

(86) PCT No.: PCT/JP2007/066354
§ 371 (c)(1),
(2), (4) Date: Feb. 23, 2009

(87) PCT Pub. No.: WO2008/023758
PCT Pub. Date: Feb. 28, 2008

(65) Prior Publication Data
US 2009/0264591 A1 Oct. 22, 2009

(30) Foreign Application Priority Data

Aug. 23, 2006 (JP) .................................. 2006-226808

(51) Int. Cl.
*C08L 67/04* (2006.01)
*C08L 53/02* (2006.01)
*C08L 53/00* (2006.01)
*C08L 47/00* (2006.01)
*C08L 23/26* (2006.01)
*C08L 23/02* (2006.01)
*C08L 23/00* (2006.01)

(52) U.S. Cl. ............ 525/66; 525/71; 525/89; 525/92 R; 525/92 H; 525/92 L

(58) Field of Classification Search ................... 525/66, 525/71, 89, 92 R, 92 H, 92 L
See application file for complete search history.

(56) References Cited

U.S. PATENT DOCUMENTS

| 5,760,105 | A | * | 6/1998 | Okada et al. | 523/201 |
| 6,759,474 | B1 | | 7/2004 | Keener et al. | |
| 2004/0204530 | A1 | * | 10/2004 | Masuda et al. | 524/474 |
| 2005/0154148 | A1 | * | 7/2005 | Nakamichi et al. | 525/450 |
| 2007/0173603 | A1 | | 7/2007 | Murakami et al. | |
| 2009/0023861 | A1 | * | 1/2009 | Shimakage et al. | 525/89 |

FOREIGN PATENT DOCUMENTS

| EP | 1 245 585 A2 | 10/2002 |
| EP | 1 245 585 A3 | 10/2002 |
| EP | 1 431 342 A2 | 6/2004 |
| EP | 1 431 342 A3 | 6/2004 |
| EP | 1 777 263 A1 | 4/2007 |
| JP | 07-011033 | 1/1995 |
| JP | 9 137047 | 5/1997 |
| JP | 9 316310 | 12/1997 |
| JP | 2725870 | 3/1998 |
| JP | 2002 37987 | 2/2002 |
| JP | 2003 301077 | 10/2003 |
| JP | 2005 307128 | 11/2005 |
| JP | 2005-307157 | 11/2005 |
| JP | 2006 199883 | 8/2006 |
| JP | 2006 241445 | 9/2006 |
| JP | 2007 63475 | 3/2007 |
| JP | 2007 106843 | 4/2007 |
| WO | WO 2006/016480 A1 | 2/2006 |

OTHER PUBLICATIONS

Office Action issued Jan. 22, 2013, in Japanese Patent Application No. 2008-530949.

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

A thermoplastic resin composition contains (i) a polylactic acid, (ii) a polyolefin, and (iii) a compatibilizer (functional group-containing polymer that includes a functional group selected from functional groups X including a carboxyl group, an acid anhydride group, an epoxy group, a (meth) acryloyl group, an amino group, an alkoxysilyl group, a hydroxyl group, an isocyanate group, and an oxazoline group). The thermoplastic resin composition contains (iii-1) a functional group-containing hydrogenated diene polymer and (iii-2) a functional group-containing olefin polymer as the component (iii).

18 Claims, No Drawings

THERMOPLASTIC RESIN COMPOSITION AND MOLDED ARTICLE OBTAINED FROM THE SAME

TECHNICAL FIELD

The present invention relates to a resin composition that includes a polylactic acid, a polyolefin, and a compatibilizer (i.e., a polymer that includes a specific functional group), and a molded article obtained using the resin composition.

BACKGROUND ART

Thermoplastic resins such as polyethylene and polypropylene have been increasingly used for packaging materials, electric/electronic components, consumer electronic appliance/automotive components, engineering/housing-related materials, domestic miscellaneous goods, and the like. Therefore, the amount of thermoplastic resin waste has also increased. Such thermoplastic resin waste is generally incinerated or buried in a landfill site. However, incineration of thermoplastic resin waste accelerates global warming due to emission of carbon dioxide. On the other hand, thermoplastic resins are chemically stable and decomposed in the ground to only a small extent so that environmental pollution occurs.

Therefore, biodegradable polymers (e.g., polylactic acid) have been increasingly used for various applications from the viewpoint of suppressing emission of carbon dioxide and protecting the environment. Since the polylactic acid is produced using plant-derived starch without using petroleum resources, carbon is circulated through the atmosphere so that an increase in carbon dioxide concentration can be suppressed. Moreover, the polylactic acid can be decomposed in a natural environment due to microorganisms that exist in the ground and water. Therefore, the polylactic acid has attracted attention as a resin that may be effective for suppressing global warming and environmental pollution.

However, since the polylactic acid has a rigid molecular structure, the polylactic acid has inferior properties (e.g., ductility, impact resistance, and heat resistance) as compared with thermoplastic resins such as polyethylene and polypropylene. Therefore, it is necessary to improve the properties of the polylactic acid in order to utilize the polylactic acid as an alternative to thermoplastic resins such as polyethylene and polypropylene.

Attempts to improve the properties (e.g., elongation, flexibility, and impact resistance) of the polylactic acid by blending various polymers with the polylactic acid have been made. For example, a method (1) that blends a block copolymer of a low-melting-point homopolymer (melting point: 150° C. or less, e.g., polycaprolactone) and a high-melting-point homopolymer (melting point: 150° C. or more, e.g., polylactic acid) with the polylactic acid has been proposed (see Patent Document 1).

A method (2) that blends a segmented polyester, natural rubber, or a styrene-butadiene copolymer with the polylactic acid (see Patent Document 2), a method (3) that blends a thermoplastic elastomer that contains an ethylene-propylene-diene rubber with the polylactic acid (see Patent Document 3), and a method (4) that blends an epoxy group-containing olefin copolymer with the polylactic acid (see Patent Document 4), have also been proposed.
Patent Document 1: JP-A-9-137047
Patent Document 2: Japanese Patent No. 2725870
Patent Document 3: JP-A-2002-37987
Patent Document 4: JP-A-9-316310

DISCLOSURE OF THE INVENTION

The method (1) improves impact resistance, but cannot produce a resin composition having sufficient impact resistance and heat resistance. According to the methods (2) to (4), since the polylactic acid exhibits poor mutual solubility with the polymer to be blended, non-uniform blending tends to occur. Therefore, a resin composition having sufficient ductility and impact resistance cannot be obtained. Moreover, the resin compositions obtained by the methods (1) to (4) exhibit insufficient moldability and appearance.

The present invention has been conceived in order to solve the above-mentioned problems. An object of the present invention is to provide a thermoplastic resin composition that exhibits excellent heat resistance, impact resistance, ductility, moldability, and appearance by improving the mutual solubility between the polylactic acid and a polyolefin, and a molded article of the thermoplastic resin composition.

The inventors of the present invention conducted extensive studies in order to solve the above-mentioned problems. As a result, the inventors found that the above-mentioned problems can be solved by a thermoplastic resin composition that contains a polylactic acid, a polyolefin, and a compatibilizer, wherein a functional group-containing hydrogenated diene polymer and a functional group-containing olefin polymer are used as the compatibilizer. The finding has lead to the completion of the present invention. According to the present invention, a compatibilizer, a thermoplastic resin composition, and a molded article given below are provided.

[1] A compatibilizer comprising (iii-1) a functional group-containing hydrogenated diene polymer that includes at least one functional group selected from functional groups X, and (iii-2) a functional group-containing olefin polymer that includes at least one functional group selected from the functional groups X, the functional groups X including a carboxyl group, an acid anhydride group, an epoxy group, a (meth) acryloyl group, an amino group, an alkoxysilyl group, a hydroxyl group, an isocyanate group, and an oxazoline group.

[2] The compatibilizer according to [1], wherein the component (iii-1) is a functional group-containing hydrogenated diene polymer that includes a conjugated diene copolymer as a base polymer, the conjugated diene copolymer including a polymer block B and at least one of a polymer block A and a polymer block C, the functional group being introduced into the base polymer, and at least 80% of double bonds of conjugated diene compound units that form the base polymer being hydrogenated, the polymer block A being a polymer block that includes aromatic vinyl compound units in an amount of 50 mass % or more, the polymer block B being a polymer block that includes conjugated diene compound units in an amount of 50 mass % or more and has a total content of 1,2-bonds and 3,4-bonds of 30 to 90%, and the polymer block C being a polymer block that includes conjugated diene compound units in an amount of 50 mass % or more and has a total content of 1,2-bonds and 3,4-bonds of less than 30%.

[3] The compatibilizer according to [1] or [2], wherein the component (iii-2) is (iii-2-1) an epoxy group-containing olefin polymer.

[4] The compatibilizer according to [1] or [2], wherein the component (iii-2) is (iii-2-2) an acid anhydride group-containing olefin polymer.

[5] The compatibilizer according to [1] or [2], the compatibilizer comprising (iii-2-1) an epoxy group-containing olefin polymer and (iii-2-2) an acid anhydride group-containing olefin polymer as the component (iii-2).

[6] A thermoplastic resin composition comprising 1 to 99 parts by mass of (i) a polylactic acid, 1 to 99 parts by mass of (ii) a polyolefin, and 0.1 to 30 parts by mass of (iii) the compatibilizer according to any one of [1] to [5] based on 100 parts by mass of the components (i) and (ii) in total.

[7] A thermoplastic resin composition comprising 1 to 99 parts by mass of (i) a polylactic acid, 1 to 99 parts by mass of (ii) a polyolefin, and 0.1 to 30 parts by mass of (iii) the compatibilizer according to [2] based on 100 parts by mass of the components (i) and (ii) in total, the component (ii) being (ii-1) polypropylene, and the component (iii-1) being a functional group-containing hydrogenated diene polymer that includes a conjugated diene copolymer as a base polymer, the conjugated diene copolymer including the polymer block A and the polymer block B, the polymer block A and the polymer block B being bonded so as to form an (A)-(B)-(A) structure or an $[(A)-(B)]_x$-Y structure (wherein x represents an integer equal to or larger than two, and Y represents a coupling agent residue).

[8] A thermoplastic resin composition comprising 1 to 99 parts by mass of (i) a polylactic acid, 1 to 99 parts by mass of (ii) a polyolefin, and 0.1 to 30 parts by mass of (iii) the compatibilizer according to [2] based on 100 parts by mass of the components (i) and (ii) in total, the component (ii) being (ii-2) polyethylene, and the component (iii-1) being a functional group-containing hydrogenated diene polymer that includes a conjugated diene copolymer as a base polymer, the conjugated diene copolymer including the polymer block A, the polymer block B, and the polymer block C, the polymer block A, the polymer block B, and the polymer block C being bonded so as to form an (A)-(B)-(C) structure or an $[(A)-(B)-(C)]_x$-Y structure (wherein x represents an integer equal to or larger than two, and Y represents a coupling agent residue).

[9] A molded article comprising the thermoplastic resin composition according to any one of [6] to [8].

The compatibilizer according to the present invention may be suitably used to produce the thermoplastic resin composition according to the present invention. The thermoplastic resin composition and the molded article according to the present invention exhibit excellent heat resistance, impact resistance, ductility, moldability, and appearance.

BEST MODE FOR CARRYING OUT THE INVENTION

Preferred embodiments of the compatibilizer, the thermoplastic resin composition, and the molded article according to the present invention are described in detail below. Note that the present invention encompasses all possible embodiments that comprise specific items of the present invention, and is not limited to the following embodiments.

Note that the term "repeating unit derived from a monomer X" used herein may be simply referred to as "unit X". The terms "X-based resin" and "X-based polymer" used herein refer to a homopolymer that contains only the unit X and a copolymer that contains the unit X as the main component (80 mol % or more).

[1] Thermoplastic Resin Composition

The thermoplastic resin composition according to the present invention includes 1 to 99 parts by mass of (i) a polylactic acid, 1 to 99 parts by mass of (ii) a polyolefin, and 0.1 to 30 parts by mass of (iii) a compatibilizer based on 100 parts by mass of the components (i) and (ii) in total. Each component is described below.

[1-1] Polylactic Acid (Component (i))

The thermoplastic resin composition according to the present invention includes a polylactic acid (hereinafter may be referred to as "component (i)"). Since the thermoplastic resin composition includes the component (i), a material that can replace polyethylene, polypropylene, and the like, has biodegradability, does not require petroleum resources, reduces the production cost, and exhibits excellent properties can be provided.

The term "polylactic acid" used herein refers to a polymer that includes a repeating unit (lactic acid unit) derived from L-lactic acid and/or D-lactic acid as the main component. The content of the lactic acid unit in the component (i) is not particularly limited insofar as the component (i) includes the lactic acid unit as the main component. It is preferable that the component (i) include the lactic acid unit in an amount of 80 mol % or more, and more preferably 90 mol % or more.

It is preferable to use a polylactic acid that includes a lactic acid unit with a high optical purity as the component (i) from the viewpoint of improving the heat resistance of the thermoplastic resin composition. Specifically, it is preferable to use a polylactic acid that includes an L-lactic acid unit or a D-lactic acid unit in an amount of 80 mol % or more, more preferably 90 mol % or more, and particularly preferably 95 mol % or more.

The component (i) may include monomer units other than the lactic acid unit. Examples of monomer units other than the lactic acid unit include polyvalent carboxylic acids such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-napthalenedicarboxylic acid, sodium 5-sulfoisophthalate, and tetrabutylphosphonium 5-sulfoisophthalic acid; aromatic polyhydric alcohols such as bisphenol A and ones obtained by adding ethylene oxide to bisphenols; polyhydric alcohols such as ethylene glycol, propylene glycol, butanediol, heptanediol, hexanediol, octanediol, nonanediol, decanediol, 1,4-cyclohexanedimethanol, neopentyl glycol, glycerol, trimethylolpropane, pentaerythritol, diethylene glycol, triethylene glycol, polyethylene glycol, polypropylene glycol, and polytetramethylene glycol; hydroxycarboxylic acids such as glycolic acid, 3-hydroxybutyric acid, 4-hydroxybutyric acid, 4-hydroxyvaleric acid, 6-hydroxycaproic acid, and hydroxybenzoic acid; lactones such as glycolide, ε-caprolactone glycolide, ε-caprolactone, β-propiolactone, δ-butyrolactone, β-butyrolactone, γ-butyrolactone, pivalolactone, and δ-valerolactone; and the like.

The content of the monomer units other than the lactic acid unit is preferably less than 20 mol %, and more preferably less than 10 mol %, so that the polylactic acid sufficiently exhibits its function and effects.

The molecular weight and the molecular weight distribution of the component (i) are not particularly limited. The molecular weight and the molecular weight distribution of the component (i) may be appropriately selected within a range that substantially enables molding. The weight average molecular weight of the component (i) is preferably 10,000 or more, more preferably 40,000 or more, and particularly preferably 80,000 or more. The term "weight average molecular weight" of the component (i) used herein refers to a polymethyl methacrylate-equivalent weight average molecular weight determined by gel permeation chromatography (GPC) using hexafluoroisopropanol as a solvent.

The melting point of the component (i) is not particularly limited. The melting point of the component (i) is preferably 120° C. or more, and more preferably 140° C. or more. The melting point of the component (i) refers to a value measured by differential scanning calorimetry (DSC).

The component (i) may be produced by a known polylactic acid production method. Specifically, the component (i) may be produced by direct polymerization of lactic acid, ring-opening polymerization through a lactide, or the like.

The content of the component (i) is required to be 1 to 99 parts by mass, and preferably 10 to 90 parts by mass, based on 100 parts by mass of the components (i) and (ii) in total. If the content of the component (i) is less than 1 part by mass, an environmental impact may increase since the amount of polylactic acid is small. If the content of the component (i) is more than 99 parts by mass, impact resistance and heat resistance may not be improved since the amount of polyolefin (component (ii)) is small.

[1-2] Polyolefin (Component (ii))

The thermoplastic resin composition according to the present invention includes a polyolefin (hereinafter may be referred to as "component (ii)") in addition to the polylactic acid (component (i)). A thermoplastic resin composition that exhibits excellent heat resistance, moldability, and dimensional stability as compared with the case of using only the polylactic acid can be obtained by mixing the component (ii) with the polylactic acid. Moreover, an inexpensive polylactic acid-based thermoplastic resin composition can be obtained by blending a polyolefin that is inexpensive and is easily available.

The term "polyolefin" used herein refers to a polymer obtained by polymerizing one or more of ethylene and/or one or more of α-olefins. The polymerization method used to obtain the polyolefin is not particularly limited. For example, a polymer obtained by a known polymerization method (e.g., a high-pressure polymerization method or a low-pressure polymerization method) or the like may be used.

Examples of the α-olefin include α-olefins having 3 to 12 carbon atoms, such as propene (hereinafter referred to as "propylene"), 1-butene, 1-pentene, 3-methyl-1-butene, 1-hexene, 3-methyl-1-pentene, 4-methyl-1-pentene, 3-ethyl-1-pentene, 1-octene, 1-decene, and 1-undecene.

Examples of the polyolefin include a polyethylene resin, a polypropylene resin, a polybutene resin, a methylpentene resin, and the like. These resins may be used either individually or in combination. Examples of the polyethylene resin include a low-density polyethylene, a medium-density polyethylene, a high-density polyethylene, a linear low-density polyethylene, an ethylene-propylene copolymer, an ethylene-octene copolymer, and the like. Examples of the polypropylene resin include a polypropylene homopolymer, a polypropylene block polymer, a polypropylene random polymer, a propylene-α-olefin copolymer, a propylene-ethylene copolymer, a propylene-butene copolymer, a propylene-ethylene-butene copolymer, and the like. Among these polyolefins, it is preferable to use the polyethylene resin or the polypropylene resin.

When using the polyethylene resin, the melt flow rate (MRF) of the polyethylene resin is preferably 0.01 to 300 g/10 min, and more preferably 0.1 to 100 g/10 min. If the MFR of the polyethylene resin is less than 0.01 g/10 min, the kneadability, extrudability, and the like of the thermoplastic resin composition may decrease. If the MFR of the polyethylene resin is more than 300 g/10 min, the strength of the thermoplastic resin composition may decrease. Note that the term "melt flow rate" used herein refers to a melt flow rate measured at a temperature of 190° C. and a load of 21.2 N in accordance with ASTM-D1238.

The content of the component (ii) is 1 to 99 parts by mass, and preferably 10 to 90 parts by mass, based on 100 parts by mass of the components (i) and (ii) in total. If the content of the component (ii) is less than 1 part by mass, heat resistance, moldability, and dimensional stability may not be sufficiently improved since the amount of polyolefin is small. If the content of the component (ii) is more than 99 parts by mass, an environmental impact increases since the amount of polylactic acid (component (i)) is small.

[1-3] Compatibilizer (Component (iii))

The thermoplastic resin composition according to the present invention includes a compatibilizer (hereinafter may be referred to as "component (iii)") in addition to the polylactic acid (component (i)) and the polyolefin (component (ii)). The components (i) and (ii) exhibit improved mutual solubility due to the component (iii) that improves interaction with the component (i) so that a thermoplastic resin composition that exhibits high ductility, high impact resistance, excellent moldability, and excellent appearance can be obtained.

As the compatibilizer, a functional group-containing polymer that has a specific functional group may be used. The term "functional group-containing polymer" used herein refers to a polymer that includes at least one functional group selected from the following functional groups X. Specifically, a polymer obtained by incorporating the above-mentioned functional group into a polymer that serves as a basic skeleton (hereinafter may be referred to as "base polymer") may be used as the component (iii). The functional groups X are reactive functional groups. The interaction with the component (i) can be improved by introducing such a reactive functional group so that the components (i) and (ii) exhibit improved mutual solubility.

Functional groups X: carboxyl group, acid anhydride group, epoxy group, (meth)acryloyl group, amino group, alkoxysilyl group, hydroxyl group, isocyanate group, and oxazoline group The thermoplastic resin composition according to the present invention includes a functional group-containing hydrogenated diene polymer (hereinafter may be referred to as "component (iii-1)") and a functional group-containing olefin polymer (hereinafter may be referred to as "component (iii-2)") as the component (iii).

[1-3(1)] Functional Group-Containing Hydrogenated Diene Polymer (Component (iii-1))

The term "functional group-containing hydrogenated diene polymer" used herein refers to a polymer that includes a conjugated diene polymer as a base polymer, the above-mentioned functional group being introduced into the base polymer, and at least 80% of double bonds of conjugated diene compound units that form the base polymer being hydrogenated. The ductility and the impact resistance of the thermoplastic resin composition can be significantly improved by mixing the component (iii-1) into the composition.

The conjugated diene polymer that serves as the base polymer of the component (iii-1) is a polymer that includes a repeating unit derived from a conjugated diene compound. Examples of the conjugated diene compound include 1,3-butadiene, isoprene, 2,3-dimethyl-1,3-butadiene, 1,3-pentadiene, 2-methyl-1,3-octadiene, 1,3-hexadiene, 4,5-diethyl-1,3-octadiene, 3-butyl-1,3-octadiene, myrcene, chloroprene, and the like. In the present invention, it is preferable to use a conjugated diene polymer that includes a repeating unit derived from 1,3-butadiene or isoprene as the base polymer from the viewpoints of availability and polymerizability of raw material monomers and provision of a thermoplastic resin composition that exhibits excellent impact resistance and cold resistance.

The conjugated diene polymer included in the component (iii-1) as the base polymer may include a repeating unit derived from a compound other than the conjugated diene compound. For example, the conjugated diene polymer may include a repeating unit derived from an aromatic vinyl compound (aromatic vinyl compound unit) or the like.

Examples of the aromatic vinyl compound include styrene, tert-butylstyrene, α-methylstyrene, p-methylstyrene, p-ethylstyrene, divinylbenzene, 1,1-diphenylstyrene, vinylnaphthalene, vinylanthracene, N,N-diethyl-p-aminoethylstyrene, vinylpyridine, and the like. In the present invention, it is preferable to use a conjugated diene polymer that includes a repeating unit derived from styrene or tert-butylstyrene as the base polymer from the viewpoints of availability and polymerizability of raw material monomers and provision of a thermoplastic resin composition that exhibits excellent impact resistance and cold resistance.

When the base polymer includes the aromatic vinyl compound, the mass ratio of the conjugated diene compound to the aromatic vinyl compound used for polymerization is preferably 100:0 to 20:80, and more preferably 97:3 to 40:60. If the mass ratio is more than 20:80, the glass transition temperature of the component (iii-1) increases to a large extent. As a result, the impact resistance and the cold resistance of the thermoplastic resin composition may decrease.

It is preferable that the component (iii-1) be a functional group-containing hydrogenated diene polymer that includes a conjugated diene copolymer as a base polymer, the conjugated diene copolymer including a polymer block B and at least one of a polymer block A and a polymer block C given below, the above-mentioned functional group being introduced into the base polymer, and at least 80% of double bonds of conjugated diene compound units that form the base polymer being hydrogenated. Specifically, it is preferable to use a conjugated diene polymer that includes the polymer block B as an essential polymer block and further includes at least one of the polymer block A and the polymer block C as the base polymer.
Polymer block A: polymer block that includes aromatic vinyl compound units in an amount of 50 mass % or more
Polymer block B: polymer block that includes conjugated diene compound units in an amount of 50 mass % or more and has a total content of 1,2-bonds and 3,4-bonds of 30 to 90%
Polymer block C: polymer block that includes conjugated diene compound units in an amount of 50 mass % or more and has a total content of 1,2-bonds and 3,4-bonds of less than 30%

Examples of the conjugated diene copolymer that includes the polymer block B and at least one of the polymer block A and the polymer block C include block copolymers having a structure shown by (A)-(B), (B)-(C), [(A)-(B)]$_x$-Y, [(B)-(C)]$_x$-Y, (A)-(B)-(C), (C)-(B)-(C), (A)-(B)-(A), [(A)-(B)-(C)]$_x$-Y, [(A)-(B)-(A)]$_x$-Y, [(B)-(C)-(B)]$_x$-Y, (A)-(B)-(A)-(B), (B)-(A)-(B)-(A), (B)-(C)-(B)-(C), (C)-(B)-(C)-(B), [(A)-(B)-(A)-(B)]$_x$-Y, (A)-(B)-(A)-(B)-(A), [(A)-(B)-(A)-(B)-(A)]$_x$-Y, [(B)-(A)]$_x$-Y, [(C)-(B)]$_x$-Y, (B)-(A)-(B)-(C), (B)-(A)-(C)-(A), or [(C)-(A)-(B)-(C)]$_x$-Y (wherein (A) represents the polymer block A, (B) represents the polymer block B, (C) represents the polymer block C, x represents an integer equal to or larger than two, and Y represents a coupling agent residue).

When producing a pellet-shaped polymer, a block copolymer that includes at least one block A and/or block C as an outer block component is preferably used as the base polymer.

When the component (ii) is polypropylene (hereinafter may be referred to as "component (ii-1)"), it is preferable that the component (iii-1) be a functional group-containing hydrogenated diene polymer that includes a conjugated diene copolymer as a base polymer, the conjugated diene copolymer including the polymer block A and the polymer block B, the polymer block A and the polymer block B being bonded so as to form an (A)-(B)-(A) structure or an [(A)-(B)]$_x$-Y structure (wherein x represents an integer equal to or larger than two, and Y represents a coupling agent residue). The polymer block B and polypropylene exhibit improved mutual solubility by utilizing such a polymer so that the ductility and the impact resistance of the thermoplastic resin composition are improved.

When the component (ii) is polyethylene (hereinafter may be referred to as "component (ii-2)"), it is preferable that the component (iii-1) be a functional group-containing hydrogenated diene polymer that includes a conjugated diene copolymer as a base polymer, the conjugated diene copolymer including the polymer block A, the polymer block B, and the polymer block C, the polymer block A, the polymer block B, and the polymer block C being bonded so as to form an (A)-(B)-(C) structure or an [(A)-(B)-(C)]$_x$-Y structure (wherein x represents an integer equal to or larger than two, and Y represents a coupling agent residue). The polymer block C and polyethylene exhibit improved mutual solubility by utilizing such a polymer so that the ductility and the impact resistance of the thermoplastic resin composition are improved.

The block copolymer that includes two or more blocks may be a random copolymer or a tapered copolymer in which the content of the aromatic vinyl compound or the conjugated diene compound successively changes in the block. Examples of the coupling agent that couples the polymer blocks include halogen compounds such as methyldichlorosilane, methyltrichlorosilane, butyltrichlorosilane, tetrachlorosilane, dibromoethane, tetrachlorotin, butyltrichlorotin, tetrachlorogermanium, and bis(trichlorosilyl)ethane; epoxy compounds such as epoxidized soybean oil; carbonyl compounds such as diethyl adipate, dimethyl adipate, dimethyl terephthalate, and diethyl terephthalate; polyvinyl compounds such as divinylbenzene; polyisocyanates; and the like.

The component (iii-1) is a polymer that includes the above-mentioned conjugated diene polymer as the base polymer, at least 80% of double bonds of conjugated diene compound units that form the base polymer being hydrogenated. The upper limit of the hydrogenation rate is not particularly limited. It is preferable that 90% or more, and more preferably 95% or more of the double bonds be hydrogenated so that a thermoplastic resin composition that exhibits excellent weatherability and excellent heat resistance is obtained.

The component (iii-1) is a polymer in which at least one functional group selected from the functional groups X is introduced into the base polymer. It is preferable that the component (iii-1) be a polymer having an amino group that exhibits a high degree of interaction with the component (i), with a polymer having a primary amino group being more preferable.

It is preferable that the component (iii-1) be a polymer in which the average number of the above-mentioned functional groups is 0.01 to 100, and more preferably 0.1 to 10 per molecule. If the average number of functional groups is less than 0.01 per molecule, interaction with the component (i) may decrease. As a result, the components (i) and (ii) may exhibit poor mutual solubility. If the average number of functional groups is more than 100 per molecule, the flowability and the processability of the thermoplastic resin composition may decrease.

The molecular weight of the component (iii-1) is not particularly limited. The weight average molecular weight of the component (iii-1) is preferably 30,000 to 2,000,000, more preferably 40,000 to 1,000,000, and particularly preferably 50,000 to 500,000. If the weight average molecular weight of the component (iii-1) is less than 30,000, the strength and the dimensional stability of the thermoplastic resin composition may decrease. If the weight average molecular weight of the component (iii-1) is more than 2,000,000, the solution viscosity and the melt viscosity of the component (iii-1) may increase to a large extent. As a result, the processability and the productivity of the thermoplastic resin composition may decrease. The term "weight average molecular weight" of the component (iii-1) used herein refers to a polystyrene-equivalent weight average molecular weight determined by gel permeation chromatography (GPC).

The component (iii-1) may be produced by one of the following methods (a) to (e), for example.

Method (a)

The method (a) subjects the conjugated diene compound alone or the conjugated diene compound and the aromatic vinyl compound to block copolymerization in the presence of an organic alkali metal compound, hydrogenates the copolymer to obtain a hydrogenated diene polymer, and allows the hydrogenated diene polymer to react with at least one compound selected from a (meth)acryloyl group-containing compound shown by the following general formula (1), an epoxy group-containing compound shown by the following general formula (2), and maleic anhydride in a solution or a mixer such as an extruder.

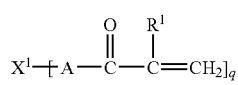

(1)

wherein $R^1$ represents a hydrogen atom or a methyl group, A represents a single bond or a hydrocarbon group having 1 to 20 carbon atoms that may contain a hetero atom, $X^1$ represents an alkoxysilyl group, a hydroxyl group, an amino group, a carboxyl group, an epoxy group, an isocyanate group, or an oxazoline group, an q represents an integer from 1 to 3 when $X^1$ represents an amino group, or otherwise represents 1.

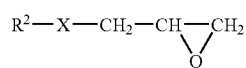

(2)

wherein $R^2$ represents an alkenyl group having 2 to 18 carbon atoms, and X represents a carbonyloxy group, a methyleneoxy group, or a phenyleneoxy group.

Examples of the polymer obtained by the method (a) include a maleic anhydride-modified styrene-ethylene-butylene-styrene block copolymer, a maleic anhydride-modified styrene-ethylene-propylene-styrene block copolymer, a maleic anhydride-modified styrene-ethylene-butylene-propylene-styrene block copolymer, an epoxy-modified styrene-ethylene-butylene-styrene block copolymer, an epoxy-modified styrene-ethylene-propylene-styrene block copolymer, an epoxy-modified styrene-ethylene-butylene-propylene-styrene block copolymer, and the like.

Method (b)

The method (b) subjects the conjugated diene compound alone or the conjugated diene compound and the aromatic vinyl compound to block copolymerization in the presence of an organic alkali metal compound that has an amino group and is shown by the following general formula (3) or (4), and hydrogenates the copolymer.

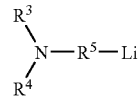

(3)

wherein $R^3$ and $R^4$ represent trialkylsilyl groups having 3 to 18 carbon atoms, or one of $R^3$ and $R^4$ represents a trialkylsilyl group having 3 to 18 carbon atoms and the other of $R^3$ and $R^4$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, and $R^5$ represents an alkylene group or an alkylidene group having 1 to 20 carbon atoms.

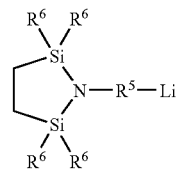

(4)

wherein $R^5$ represents an alkylene group or an alkylidene group having 1 to 20 carbon atoms, and $R^6$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms.

Examples of the organic alkali metal compound shown by the general formula (3) or (4) include 3-lithio-1-[N,N-bis(trimethylsilyl)]aminopropane, 2-lithio-1-[N,N-bis(trimethylsilyl)]aminoethane, 3-lithio-2,2-dimethyl-1-[N,N-bis(trimethylsilyl)]aminopropane, 2,2,5,5-tetramethyl-1-(3-lithiopropyl)-1-aza-2,5-disilacyclopentane, 2,2,5,5-tetramethyl-1-(3-lithio-2,2-dimethylpropyl)-1-aza-2,5-disilacyclopentane, 2,2,5,5-tetramethyl-1-(2-lithioethyl)-1-aza-2,5-disilacyclopentane, 3-lithio-1-[N-(tert-butyldimethylsilyl)-N-trimethylsilyl]aminopropane, 3-lithio-1-(N-methyl-N-trimethylsilyl)aminopropane, 3-lithio-1-(N-ethyl-N-trimethylsilyl)aminopropane, and the like.

Method (c)

The method (c) subjects the conjugated diene compound alone or the conjugated diene compound and the aromatic vinyl compound to block copolymerization in the presence of an unsaturated monomer that has an amino group and is shown by the following general formula (5) or (6) and an organic alkali metal compound, and hydrogenates the copolymer.

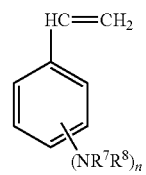

(5)

wherein $R^7$ and $R^8$ represent trialkylsilyl groups having 3 to 18 carbon atoms, or one of $R^7$ and $R^8$ represents a trialkylsilyl group having 3 to 18 carbon atoms and the other of $R^7$ and $R^8$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, and n represents an integer from 1 to 3.

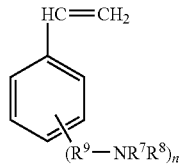

(6)

wherein $R^7$ and $R^8$ represent trialkylsilyl groups having 3 to 18 carbon atoms, or one of $R^7$ and $R^8$ represents a trialkylsilyl group having 3 to 18 carbon atoms and the other of $R^7$ and $R^8$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, and $R^9$ represents an alkylene group or an alkylidene group having 1 to 20 carbon atoms.

Examples of the unsaturated monomer shown by the general formula (5) or (6) include p-[N,N-bis(trimethylsilyl)amino]styrene, p-[N,N-bis(trimethylsilyl)aminomethyl]styrene, p-{2-[N,N-bis(trimethylsilyl)amino]ethyl}styrene, m-[N,N-bis(trimethylsilyl)amino]styrene, p-(N-methyl-N-trimethylsilylamino)styrene, p-(N-methyl-N-trimethylsilylaminomethyl)styrene, and the like.

Method (d)

The method (d) subjects the conjugated diene compound alone or the conjugated diene compound and the aromatic vinyl compound to block copolymerization in the presence of an organic alkali metal compound, allows the active site of the copolymer to react with an alkoxysilane compound shown by the following general formula (7), and hydrogenates the resulting polymer.

(7)

wherein $R^{10}$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms. When the alkoxysilane compound contains two or more $R^{10}$s, the $R^{10}$s may be identical or different functional groups. $R^{11}$ represents an alkyl group having 1 to 20 carbon atoms, an aryl group having 6 to 20 carbon atoms, or an aralkyl group having 7 to 20 carbon atoms. When the alkoxysilane compound contains two or more $OR^{11}$ groups, the $R^{11}$s may be identical or different functional groups. X represents a substituent having a polar group containing a nitrogen atom. When the alkoxysilane compound contains two or more Xs, the Xs may be identical or different functional groups. The Xs may be independent substituents, or may form a cyclic structure. m and n represent integers from 1 to 3. Note that the sum of m and n is an integer from 1 to 4.

Examples of the alkoxysilane compound shown by the general formula (7) include N,N-bis(trimethylsilyl)aminopropyltrimethoxysilane, N,N-bis(trimethylsilyl)aminopropyltriethoxysilane, N,N-bis(trimethylsilyl)aminopropyldimethylethoxysilane, N,N-bis(trimethylsilyl)aminopropyldimethylmethoxysilane, N,N-bis(trimethylsilyl)aminopropylmethyldiethoxysilane, N,N-bis(trimethylsilyl)aminopropylmethyldimethoxysilane, N,N-bis(trimethylsilyl)aminoethyltrimethoxysilane, N,N-bis(trimethylsilyl)aminoethyltriethoxysilane, N,N-bis(trimethylsilyl)aminoethyldimethylethoxysilane, N,N-bis(trimethylsilyl)aminoethyldimethylmethoxysilane, N,N-bis(trimethylsilyl)aminoethylmethyldiethoxysilane, N,N-bis(trimethylsilyl)aminoethylmethyldimethoxysilane, N-methyl-N-trimethylsilylaminopropyltrimethoxysilane, N-methyl-N-trimethylsilylaminopropyltriethoxysilane, N-methyl-N-trimethylsilylaminopropyldimethylethoxysilane, N-methyl-N-trimethylsilylaminopropyldimethylmethoxysilane, N-methyl-N-trimethylsilylaminopropylmethyldiethoxysilane, N-methyl-N-trimethylsilylaminopropylmethyldimethoxysilane, N,N-dimethylaminopropyltrimethoxysilane, N,N-dimethylaminopropyltriethoxysilane, N,N-dimethylaminopropyldimethylethoxysilane, N,N-dimethylaminopropyldimethylmethoxysilane, N,N-dimethylaminopropylmethyldiethoxysilane, N,N-dimethylaminopropylmethyldimethoxysilane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(1,3-dimethylbutylidene)-3-(trimethoxysilyl)-1-propanamine, N-(1-methylethylidene)-3-(trimethoxysilyl)-1-propanamine, N-ethylidene-3-(trimethoxysilyl)-1-propanamine, N-(1-methylpropylidene)-3-(trimethoxysilyl)-1-propanamine, N-(4-N,N-dimethylaminobenzylidene)-3-(trimethoxysilyl)-1-propanamine, N-(1,3-dimethylbutylidene)-3-(methyldimethoxysilyl)-1-propanamine, N-(1-methylethylidene)-3-(methyldimethoxysilyl)-1-propanamine, N-ethylidene-3-(methyldimethoxysilyl)-1-propanamine, N-(1-methylpropylidene)-3-(methyldimethoxysilyl)-1-propanamine, N-(4-N,N-dimethylaminobenzylidene)-3-(methyldimethoxysilyl)-1-propanamine, N-(1,3-dimethylbutylidene)-3-(methyldiethoxysilyl)-1-propanamine, N-(1-methylethylidene)-3-(methyldiethoxysilyl)-1-propanamine, N-ethylidene-3-(methyldiethoxysilyl)-1-propanamine, N-(1-methylpropylidene)-3-(methyldiethoxysilyl)-1-propanamine, N-(4-N,N-dimethylaminobenzylidene)-3-(methyldiethoxysilyl)-1-propanamine, N-(1,3-dimethylbutylidene)-3-(dimethylmethoxysilyl)-1-propanamine, N-(1-methylethylidene)-3-(dimethylmethoxysilyl)-1-propanamine, N-ethylidene-3-(dimethylmethoxysilyl)-1-propanamine, N-(1-methylpropylidene)-3-(dimethylmethoxysilyl)-1-propanamine, N-(4-N,N-dimethylaminobenzylidene)-3-(dimethylmethoxysilyl)-1-propanamine, N-(1,3-dimethylbutylidene)-3-(dimethylethoxysilyl)-1-propanamine, N-(1-methylethylidene)-3-(dimethylethoxysilyl)-1-propanamine, N-ethylidene-3-(dimethylethoxysilyl)-1-propanamine, N-(1-methylpropylidene)-3-(dimethylethoxysilyl)-1-propanamine, N-(4-N,N-dimethylaminobenzylidene)-3-(dimethylethoxysilyl)-1-propanamine, and the like.

Method (e)

The method (e) subjects the conjugated diene compound alone or the conjugated diene compound and the aromatic vinyl compound to block copolymerization in the presence of an organic alkali metal compound, allows the active site of the copolymer to react with an epoxy compound, a ketone compound, or a nitrogen-containing compound excluding the nitrogen-containing compounds shown by the general formulas (3) to (7), and hydrogenates the resulting polymer.

Examples of the epoxy compound include ethylene oxide, propylene oxide, and the like. Examples of the ketone compound include acetone, benzophenone, and the like. Examples of the nitrogen-containing compound excluding the nitrogen-containing compounds shown by the general formulas (3) to (7) include nitrogen-containing compounds shown by the following general formula (8) and the like.

$$R^{12}R^{13}C=N-Y \quad (8)$$

wherein $R^{12}$ and $R^{13}$ identically or individually represent a hydrogen atom, an alkyl group having 1 to 20 carbon atoms, an aryl group having 6 to 20 carbon atoms, an aralkyl group having 7 to 20 carbon atoms, or an organosiloxy group having 1 to 100 carbon atoms, and Y represents a hydrogen atom, a trialkylsilyl group having 3 to 18 carbon atoms, an alkyl group having 1 to 20 carbon atoms, an aryl group having 6 to 20 carbon atoms, an aralkyl group having 7 to 20 carbon atoms, or an organosiloxy group having 1 to 100 carbon atoms.

Examples of the nitrogen-containing compounds shown by the general formula (8) include N-benzylidenemethylamine, N-benzylideneethylamine, N-benzylidenebutylamine, N-benzylideneaniline, and the like.

[1-3(2)] Functional Group-Containing Olefin Polymer (Component (iii-2))

The term "functional group-containing olefin polymer" used herein refers to a polymer that includes an olefin polymer as a base polymer, the above-mentioned functional group being introduced into the base polymer. The ductility, impact resistance, moldability, and appearance of the thermoplastic resin composition can be improved by mixing the component (iii-2) into the composition.

The olefin polymer that serves as the base polymer of the component (iii-2) is a polymer that includes a repeating unit derived from an olefin compound (i.e., ethylene and/or α-olefin). Examples of the α-olefin include the compounds mentioned relating to the polyolefin. Note that the base polymer of the component (iii-2) may include a repeating unit derived from a compound other than the olefin compound.

The component (iii-2) is a polymer in which at least one functional group selected from the functional groups X is introduced into the base polymer. The functional group may be introduced into the base polymer by copolymerizing the olefin compound with a monomer having the functional group, for example. For example, a polymer into which a carboxyl group is introduced may be obtained by copolymerizing ethylene and (meth)acrylic acid. A polymer into which an acid anhydride group is introduced may be obtained by copolymerizing ethylene and maleic anhydride. A polymer into which a (meth)acryloyl group is introduced may be obtained by copolymerizing ethylene and the (meth)acryloyl group-containing compound shown by the general formula (1). A polymer into which an epoxy group is introduced may be obtained by copolymerizing ethylene and the epoxy group-containing compound shown by the general formula (2). Note that the functional group may be introduced by graft polymerization or the like instead of copolymerization.

Specific examples of the component (iii-2) include an ethylene-(meth)acrylic acid copolymer, an ionomer obtained by neutralizing some of the carboxyl groups of an ethylene-(meth)acrylic acid copolymer with a metal ion (e.g., Na, Zn, or Mg), a saponified product of an ethylene-(meth)acrylic acid copolymer, an ethylene-(meth) acryloyl copolymer, an ethylene-(meth)acrylate-maleic anhydride copolymer, an ethylene-vinyl isocyanate copolymer, maleic anhydride-modified polyethylene, a maleic anhydride-modified ethylene-propylene copolymer, an ethylene-glycidyl methacrylate copolymer, an epoxy-modified ethylene-propylene copolymer, hydroxyl-modified polyethylene, a hydroxyl-modified ethylene-propylene copolymer, and the like.

Among these polymers, the polymer having an epoxy group is preferable from the viewpoint of improving ductility and impact resistance, with the ethylene-glycidyl methacrylate copolymer being more preferable. The polymer having an acid anhydride group is also preferable from the viewpoint of improving moldability and appearance, with maleic anhydride-modified polyethylene and maleic anhydride-modified polypropylene being more preferable.

A polymer into which the above-mentioned functional group is introduced may be used as the component (iii-2) to such an extent that the resulting thermoplastic resin composition exhibits mechanical properties and moldability in a well-balanced manner. Specifically, it is preferable that the component (iii-2) be a polymer in which the average number of the above-mentioned functional groups is 0.01 to 1000, and more preferably 0.1 to 500 per molecule. If the average number of functional groups is less than 0.01 per molecule, an excellent compatibility may not be obtained. As a result, the effect of improving ductility and impact resistance may decrease. If the average number of functional groups is more than 1000 per molecule, the flowability of the thermoplastic resin composition may decrease. As a result, the moldability of the thermoplastic resin composition may deteriorate to a large extent.

The molecular weight of the component (iii-2) is not particularly limited. The weight average molecular weight of the component (iii-2) is preferably 10,000 to 2,000,000, more preferably 20,000 to 1,500,000, and particularly preferably 30,000 to 1,000,000. If the weight average molecular weight of the component (iii-2) is less than 10,000, the effect of improving ductility and impact resistance may decrease. If the weight average molecular weight of the component (iii-2) is more than 2,000,000, the flowability of the thermoplastic resin composition may decrease. As a result, the moldability of the thermoplastic resin composition may deteriorate. The term "weight average molecular weight" of the component (iii-2) used herein refers to a polystyrene-equivalent weight average molecular weight determined by gel permeation chromatography (GPC).

The content of the component (iii) is 0.1 to 30 parts by mass, and preferably 0.5 to 20 parts by mass, based on 100 parts by mass of the components (i) and (ii) in total. If the content of the component (iii) is less than 0.1 part by mass, ductility and impact resistance may not be sufficiently improved since the amount of functional group-containing polymer is small. If the content of the component (iii) is more than 30 parts by mass, the flowability of the thermoplastic resin composition may decrease since the amount of functional group-containing polymer is too large. As a result, the moldability of the thermoplastic resin composition may deteriorate.

The content of the component (iii-1) is preferably 0.05 to 29.95 parts by mass, and more preferably 0.1 to 19.9 parts by mass, based on 100 parts by mass of the components (i) and (ii) in total. If the content of the component (iii-1) is less than 0.05 parts by mass, ductility and impact resistance may not be sufficiently improved. If the content of the component (iii-1) is more than 29.95 parts by mass, the flowability of the thermoplastic resin composition may decrease. As a result, the moldability of the thermoplastic resin composition may deteriorate.

The content of the component (iii-2) is preferably 0.05 to 29.95 parts by mass, and more preferably 0.1 to 19.9 parts by mass, based on 100 parts by mass of the components (i) and (ii) in total. If the content of the component (iii-2) is less than 0.05 parts by mass, impact resistance and flexibility may not be sufficiently improved. If the content of the component (iii-2) is more than 29.95 parts by mass, the flowability of the thermoplastic resin composition may decrease. As a result, the moldability of the thermoplastic resin composition may deteriorate.

[1-4] Additive

The thermoplastic resin composition according to the present invention may include additives other than the components (i), (ii), and (ii) insofar as the properties of the thermoplastic resin composition are not adversely affected. Examples of the additives include other thermoplastic resins, a stabilizer, an antioxidant, a release agent, a UV absorber, a filler, a lubricant, a plasticizer, a coloring inhibitor, a coloring agent, an antibacterial agent, a nucleating agent, an antistatic agent, and the like.

Examples of other thermoplastic resins include biodegradable polymers other than the polylactic acid (e.g., polycaprolactone and polybutylene succinate), polycarbonate, polyethylene terephthalate, polybutylene terephthalate, polyallylate, polymethyl methacrylate, and the like.

The stabilizer is added to improve hydrolysis resistance. For example, an epoxy-based stabilizer or the like may be used. As the epoxy-based stabilizer, 3,4-epoxycyclohexylmethyl-3,4-epoxycyclohexane carboxylate is preferably used. Examples of the antioxidant include a phosphorus-based stabilizer, a hindered phenol antioxidant, an epoxy-based stabilizer, a sulfur-based stabilizer, and the like.

Examples of the nucleating agent include talc, sodium 2,2'-methylenebis(4,6-di-t-butylphenyl)phosphate, sodium bis(4-t-butylphenyl)phosphate, bis(p-methylbenzylidene) sorbitol, alkyl-substituted dibenzylidene sorbitol, bis(p-ethylbenzylidene)sorbitol, and the like.

Examples of the antistatic agent include fatty acid salts, higher alcohol sulfates, sulfates of aliphatic amines and aliphatic amides, fatty alcohol phosphates, formalin-condensed naphthalene sulfonates, aliphatic amine salts, quaternary ammonium salts, alkylpyridinium salts, polyoxyethylene alkyl ethers, polyoxyethylene alkylphenol ethers, polyoxyethylene alkyl esters, sorbitan alkyl esters, polyoxyethylene sorbitan alkyl esters, imidazoline derivatives, and the like.

[2] Production Method

The thermoplastic resin composition according to the present invention can be very easily produced by melt-mixing the above-mentioned components. The mixing method and the mixer used are not particularly limited. It is preferable to use a twin-screw extruder, a Banbury mixer, or the like with high mixing efficiency. It is industrially advantageous to use an instrument that enables a continuous process. The melt-mixing temperature is preferably 150 to 240° C.

[3] Molded Article

A molded article may be obtained using the thermoplastic resin composition according to the present invention by a known molding method such as injection molding, extrusion molding, inflation molding, rotational molding, press molding, hollow molding, calendering, or blow molding.

Since the thermoplastic resin composition according to the present invention exhibits excellent heat resistance, impact resistance, ductility, moldability, and appearance, the thermoplastic resin composition according to the present invention may be used for various industrial products such as a food package, a tray, a sheet, a tube, a film, a garbage bag, a packing bag, a fiber, a laminate, a coating material, an electric/electronic component (e.g., connector, printed circuit board, motor cover, and bulb socket cover), a housing of an office automation apparatus (e.g., computer) and a consumer electrical appliance or automotive component (e.g., injection coil cover, engine cover, and wheel cover), a precision component, an engineering/construction material (e.g., window frame (sash)), and domestic miscellaneous goods (e.g., hanger, chair, and garbage box). In particular, the thermoplastic resin composition according to the present invention may be suitably used for a food package, a tray, a film, a garbage bag, and a packing bag for which ductility, impact resistance, and moldability are required.

EXAMPLES

The thermoplastic resin composition according to the present invention is further described below by way of examples. Note that the following examples merely illustrate some embodiments of the present invention. Accordingly, the following examples should not be construed as limiting the present invention. In the examples and comparative examples, the terms "part" and "%" respectively refer to "part by mass" and "mass %" unless otherwise indicated.

(1) Synthesis and Evaluation of Component (iii-1)

The functional group-containing hydrogenated diene polymer (component (iii-1)) used as the raw material for the thermoplastic resin composition according to the present invention was synthesized. The synthesis method is given below (see synthesis examples). The properties of the component (iii-1) were measured and evaluated using the following methods.

(1) Vinyl Bond Content (1,2-Bond Content and 3,4-Bond Content)

The vinyl bond content was calculated by the Hampton method using infrared spectroscopy.

(2) Styrene Content

The styrene content was calculated from a $^1$H-NMR spectrum (270 MHz) using carbon tetrachloride as a solvent.

(3) Weight Average Molecular Weight

The polystyrene-equivalent weight average molecular weight was calculated by gel permeation chromatography (GPC) ("HLC-8120" manufactured by Tosoh Corp.).

(4) Melt Flow Rate (MFR)

The melt flow rate was measured at a temperature of 230° C. and a load of 21.2 N in accordance with JIS K 7210.

(5) Functional Group Content

The term "functional group content" refers to the number of functional groups in the polymer, and is expressed by the following equation (9).

$$\text{Functional group content} = \text{number of functional groups per polymer (one molecular chain)} \quad (9)$$

The functional group content was determined in accordance with the amine titration method described in Analy. Chem. 564 (1952). Specifically, the component (ii) was purified and then dissolved in an organic solvent. $HClO_4$/$CH_3COOH$ was added dropwise to the solution until the color of the solution turned from purple to light blue using methyl violet as an indicator. The functional group content was calculated from the amount of $HClO_4$/$CH_3COOH$ added.

(6) Hydrogenation Rate of Conjugated Diene

The hydrogenation rate of the conjugated diene was calculated from a $^1$H-NMR spectrum (270 MHz) using carbon tetrachloride as a solvent.

Synthesis Example 1

Synthesis of Polymer-1

A reaction vessel (50 l), of which the atmosphere was replaced by nitrogen, was charged with cyclohexane (25 kg), tetrahydrofuran (750 g), styrene (500 g), and 2,2,5,5-tetramethyl-1-(3-lithiopropyl)-1-aza-2,5-disilacyclopentane (14.5 g). The components were subjected to adiabatic polymerization at 50° C. After completion of polymerization, 1,3-butadiene (4250 g) was added at 20° C. The components were then again subjected to adiabatic polymerization. After 30 minutes, styrene (250 g) was added to the mixture. The components were then further subjected to polymerization.

After completion of polymerization, hydrogen gas was supplied to the mixture with stirring at a pressure of 0.4 MPa-Gauge for 20 minutes to react with polymer-terminal lithium (living anion) to obtain lithium hydride. The reaction solution was then heated to 90° C., and subjected to a hydrogenation reaction using a catalyst containing titanocene dichloride as the main component. After completion of hydrogen absorption, the reaction solution was allowed to cool to room temperature at normal pressure, and was removed from the reaction vessel. The reaction solution was then poured into water with stirring. The solvent was removed by steam stripping to obtain a functional group-containing hydrogenated diene polymer having an A-B-A structure (hereinafter referred to as "polymer-1").

The molecular properties of the polymer-1 were then measured. The vinyl bond content of the polybutadiene block (polymer block B) was 78%, the styrene content of the polymer before hydrogenation was 15 mass %, the weight average molecular weight was 120,000, the MFR was 22.1 g/10 min, the functional group content was 0.98 per polymer, and the hydrogenation rate was 97%. The results are shown in Table 1.

nents were allowed to react at 30 minutes. The silane compound was thus introduced into the active site of the diene polymer. After completion of the reaction, a hydrogenation reaction was carried out and the catalyst was removed in the same manner as in Synthesis Example 1 to obtain a functional group-containing hydrogenated diene copolymer having an A-B-C structure (hereinafter referred to as "polymer-2").

The molecular properties of the polymer-2 were then measured. The vinyl bond content of the polybutadiene block (polymer block B) was 42%, the styrene content of the polymer before hydrogenation was 5 mass %, the weight average molecular weight was 140,000, the MFR was 2.4 g/10 min, the functional group content was 0.88 per polymer, and the hydrogenation rate was 99%. The results are shown in Table 1.

Synthesis Example 3

Synthesis of Polymer-3)

A reaction vessel (50 l), of which the atmosphere was replaced by nitrogen, was charged with cyclohexane (30 kg) and 1,3-butadiene (1750 g). After the addition of tetrahydrofuran (1.5 g) and n-butyllithium (4 g), the components were subjected to adiabatic polymerization at 60° C. for 40 minutes. After completion of polymerization, the reaction solution was cooled to 30° C. After the addition of tetrahydrofuran (60 g), 1,3-butadiene (2250 g), and styrene (750 g), the components were again subjected to adiabatic polymerization. After the conversion rate reached almost 100%, styrene (250

TABLE 1

| | | | iii-1-1 Polymer-1 | iii-1-2 Polymer-2 | iii-1-3 Polymer-3 |
|---|---|---|---|---|---|
| Base polymer | Styrene | (mass %) | 15 | 5 | 20 |
| | Butadiene | (mass %) | 85 | 95 | 80 |
| | Vinyl bond content of block B | (%) | 78 | 42 | 40 |
| | Structure | | A-B-A | A-B-C | A-B-C |
| | Weight average molecular weight | (×10$^4$) | 12 | 14 | 11 |
| Functional group-containing hydrogenated diene polymer | Hydrogenation rate | (%) | 97 | 99 | 99 |
| | MFR | (g/10 min) | 22.1 | 2.4 | 3.4 |
| | Modifier | | (a) | (b) | (b) |
| | Functional group | | Amino group | Amino group | Amino group |
| | Amount of functional group | (per polymer) | 0.98 | 0.88 | 0.85 |

(a): 2,2,5,5-Tetramethyl-1-(3-lithiopropyl)-1-aza-2,5-disilacyclopentane
(b): N,N-Bis(trimethylsilyl)aminopropylmethyldimethoxysilane Synthesis Example 2

Synthesis of Polymer-2)

A reaction vessel (50 l), of which the atmosphere was replaced by nitrogen, was charged with cyclohexane (30 kg) and 1,3-butadiene (1000 g). After the addition of tetrahydrofuran (1.5 g) and n-butyllithium (4 g), the components were subjected to adiabatic polymerization at 60° C. for 40 minutes. After completion of polymerization, the reaction solution was cooled to 30° C. After the addition of tetrahydrofuran (60 g) and 1,3-butadiene (3750 g), the components were again subjected to adiabatic polymerization. After the conversion rate reached almost 100%, styrene (250 g) was added to the mixture. The components were then polymerized to obtain a diene copolymer. After the addition of N,N-bis(trimethylsilyl)aminopropylmethyldimethoxysilane (17 g), the compog) was added to the mixture. The components were then polymerized to obtain a diene copolymer. After the addition of N,N-bis(trimethylsilyl)aminopropylmethyldimethoxysilane (17 g), the components were allowed to react at 30 minutes. The silane compound was thus introduced into the active site of the diene polymer. After completion of the reaction, a hydrogenation reaction was carried out and the catalyst was removed in the same manner as in Synthesis Example 1 to obtain a functional group-containing hydrogenated diene copolymer having an A-B-C structure (hereinafter referred to as "polymer-3").

The molecular properties of the polymer-3 were then measured. The vinyl bond content of the polybutadiene block (polymer block B) was 40%, the styrene content of the polymer before hydrogenation was 20 mass %, the weight average molecular weight was 110,000, the MFR was 3.4 g/10 min, the functional group content was 0.85 per polymer, and the hydrogenation rate was 99%. The results are shown in Table 1.

(2) Production of Thermoplastic Resin Composition

Example 1

70 parts by mass of polylactic acid (component (i)), 30 parts by mass of polypropylene (component (ii)), 6 parts by mass of the polymer-1 synthesized in Synthesis Example 1 (component (iii-1), and 4 parts by mass of an ethylene-glycidyl methacrylate copolymer (component (iii-2-1)) (the water content of each component was sufficiently reduced using a vacuum dryer) were mixed. The components were mixed with heating at 200° C. using an extruder (diameter: 40 mm) (manufactured by Ikegai) to obtain a strand. The strand was cut using a pelletizer to obtain pellets. The pellets were dried using a vacuum dryer to obtain the thermoplastic resin composition of Example 1. The evaluation results are shown in Table 2.

TABLE 2

|  |  |  |  | Example 1 | Example 2 | Example 3 | Example 4 | Example 5 | Example 6 |
|---|---|---|---|---|---|---|---|---|---|
| Composition | (i) |  | Parts | 70 | 70 | 70 | 30 | 70 | 70 |
|  | (ii) | (ii-1) | by | 30 | 30 | 30 | 70 | — | — |
|  |  | (ii-2) | mass | — | — | — | — | 30 | 30 |
|  | (iii) | (iii-1-1) |  | 6 | 4 | 6 | 6 | — | — |
|  |  | (iii-1-2) |  | — | — | — | — | 6 | 4 |
|  |  | (iii-1-3) |  | — | — | — | — | — | — |
|  |  | (iii-2-1) |  | 4 | 6 | 2 | 4 | 4 | 6 |
|  |  | (iii-2-2a) |  | — | — | 2 | — | — | — |
|  |  | (iii-2-2b) |  | — | — | — | — | — | — |
| Properties | Moldability |  |  | Good | Good | Excellent | Excellent | Good | Good |
|  | Appearance |  |  | Good | Good | Excellent | Excellent | Good | Good |
|  | Impact resistance |  | kJ/m² | 8.0 | 7.5 | 7.0 | 10.0 | 27.4 | 25.0 |
|  |  |  |  | Good | Good | Good | Good | Good | Good |
|  | Ductility |  | Puncture | Ductile | Ductile | Ductile | Ductile | Ductile | Ductile |
|  |  |  |  | Good | Good | Good | Good | Good | Good |
|  | Ductility | Elongation | % | 27 | 24 | 22 | 120 | 36 | 33 |
|  |  | at break | Evaluation | Good | Good | Good | Excellent | Good | Good |
|  | Heat resistance |  | ° C. | 72 | 75 | 74 | 141 | 70 | 72 |
|  |  |  | Evaluation | Good | Good | Good | Excellent | Good | Good |

|  |  |  |  | Example 7 | Example 8 | Example 9 | Example 10 |
|---|---|---|---|---|---|---|---|
| Composition | (i) |  | Parts | 70 | 70 | 30 | 30 |
|  | (ii) | (ii-1) | by | — | — | — | — |
|  |  | (ii-2) | mass | 30 | 30 | 70 | 70 |
|  | (iii) | (iii-1-1) |  | — | — | — | — |
|  |  | (iii-1-2) |  | 6 | — | 6 | — |
|  |  | (iii-1-3) |  | — | 6 | — | 6 |
|  |  | (iii-2-1) |  | 2 | 4 | 4 | 4 |
|  |  | (iii-2-2a) |  | — | — | — | — |
|  |  | (iii-2-2b) |  | 2 | — | — | — |
| Properties | Moldability |  |  | Excellent | Good | Excellent | Excellent |
|  | Appearance |  |  | Excellent | Good | Excellent | Excellent |
|  | Impact resistance |  | kJ/m² | 21.5 | 27.0 | 15.0 | 17.0 |
|  |  |  |  | Good | Good | Good | Good |
|  | Ductility |  | Puncture | Ductile | Ductile | Ductile | Ductile |
|  |  |  |  | Good | Good | Good | Good |
|  | Ductility | Elongation | % | 34 | 39 | 130 | 150 |
|  |  | at break | Evaluation | Good | Good | Excellent | Excellent |
|  | Heat resistance |  | ° C. | 72 | 71 | 120 | 118 |
|  |  |  | Evaluation | Good | Good | Excellent | Excellent |

Examples 2 to 10 and Comparative Examples 1 to 13

The thermoplastic resin compositions of Examples 2 to 10 and Comparative Examples 1 to 13 were obtained in the same manner as in Example 1, except that the types and the amounts of the components (i), (ii), and (iii) were changed as shown in Tables 2 and 3. The results are shown in Tables 2 and 3.

Component (iii-2-2b): maleic anhydride-modified polyethylene ("Umex 2000" manufactured by Sanyo Chemical Industries, Ltd.)

(3) Evaluation of Thermoplastic Resin Composition

The properties of the thermoplastic resin composition were measured and evaluated using the following methods. The results are shown in Tables 2 and 3. Evaluation samples (injection-molded products) were prepared by molding the

TABLE 3

| | | | | Comparative Example | | | | | | |
|---|---|---|---|---|---|---|---|---|---|---|
| | | | | 1 | 2 | 3 | 4 | 5 | 6 | 7 |
| Composition | (i) | | Parts | 100 | 70 | 70 | 70 | 30 | 30 | 70 |
| | (ii) | (ii-1) | by | — | 30 | 30 | 30 | 70 | 70 | — |
| | | (ii-2) | mass | — | — | — | — | — | — | 30 |
| | (iii) | (iii-1-1) | | — | — | — | 10 | — | 10 | — |
| | | (iii-1-2) | | — | — | — | — | — | — | — |
| | | (iii-1-3) | | — | — | — | — | — | — | — |
| | | (iii-2-1) | | — | — | 10 | — | — | — | — |
| Properties | Moldability | | | Bad | Bad | Bad | Good | Good | Good | Bad |
| | Appearance | | | Good | Bad | Bad | Good | Fair | Good | Bad |
| | Impact resistance | | kJ/m$^2$ | 3.1 | 2.0 | 3.5 | 4.0 | 2.0 | 4.8 | 2.9 |
| | | | | Bad | Bad | Bad | Bad | Bad | Bad | Bad |
| | Ductility | | puncture | Brittle | Brittle | Brittle | Ductile | Brittle | Ductile | Brittle |
| | | | | Bad | Bad | Bad | Good | Bad | Good | Bad |
| | Ductility | Elongation | % | 7 | 4 | 7 | 15 | 5 | 110 | 3 |
| | | at break | Evaluation | Bad | Bad | Bad | Bad | Bad | Excellent | Bad |
| | Heat resistance | | °C. | 60 | 87 | 75 | 69 | 160 | 137 | 73 |
| | | | Evaluation | Bad | Good | Good | Bad | Excellent | Excellent | Good |

| | | | | Comparative Example | | | | | |
|---|---|---|---|---|---|---|---|---|---|
| | | | | 8 | 9 | 10 | 11 | 12 | 13 |
| Composition | (i) | | Parts | 70 | 70 | 70 | 30 | 30 | 30 |
| | (ii) | (ii-1) | by | — | — | — | — | — | — |
| | | (ii-2) | mass | 30 | 30 | 30 | 70 | 70 | 70 |
| | (iii) | (iii-1-1) | | — | — | — | — | — | — |
| | | (iii-1-2) | | — | 10 | — | — | 10 | — |
| | | (iii-1-3) | | — | — | 10 | — | — | 10 |
| | | (iii-2-1) | | 10 | — | — | — | — | — |
| Properties | Moldability | | | Bad | Fair | Fair | Good | Good | Good |
| | Appearance | | | Bad | Fair | Fair | Fair | Good | Good |
| | Impact resistance | | kJ/m$^2$ | 4.1 | 7.0 | 7.4 | 2.0 | 7.0 | 7.0 |
| | | | | Bad | Good | Good | Bad | Good | Good |
| | Ductility | | puncture | Brittle | Brittle | Brittle | Brittle | Brittle | Brittle |
| | | | | Bad | Bad | Bad | Bad | Bad | Bad |
| | Ductility | Elongation | % | 6 | 22 | 3 | 24 | 100 | 100 |
| | | at break | Evaluation | Bad | Good | Bad | Good | Excellent | Excellent |
| | Heat resistance | | °C. | 70 | 66 | 67 | 126 | 118 | 120 |
| | | | Evaluation | Good | Bad | Bad | Excellent | Excellent | Excellent |

The components (i), (ii), and (iii) used in Examples 1 to 10 and Comparative Examples 1 to 13 are given below.
Component (i): polylactic acid ("Lacea H100" manufactured by Mitsui Chemicals Inc.)
Component (ii-1): polypropylene ("BC6C" manufactured by Japan Polypropylene Corporation)
Component (ii-2): polyethylene ("HJ560" manufactured by Japan Polyethylene Corporation)
Component (iii-1-1): polymer-1 synthesized in Synthesis Example 1
Component (iii-1-2): polymer-2 synthesized in Synthesis Example 2
Component (iii-1-3): polymer-3 synthesized in Synthesis Example 3
Component (iii-2-1): ethylene-glycidyl methacrylate copolymer ("Bondfast" manufactured by Sumitomo Chemical Co., Ltd.)
Component (iii-2-2a): maleic anhydride-modified polypropylene ("Umex 1010" manufactured by Sanyo Chemical Industries, Ltd.)

thermoplastic resin compositions of Examples 1 to 10 and Comparative Examples 1 to 13 using an injection molding machine ("IS100GN" manufactured by Toshiba Machine Co., Ltd.) at a cylinder temperature of 200° C. and an injection speed of 35 mm/sec.

(1) Moldability

The thermoplastic resin composition was melted to obtain a molten polymer. The molten polymer was continuously extruded to obtain a strand. The strand was then cut using a pelletizer to obtain pellets. The moldability of the thermoplastic resin composition was evaluated by visually observing the extrudability of the strand and the appearance of the extruded strand.

A case where surging did not occur, breakage of the strand was not observed, and the pellets could be formed stably was evaluated as "Excellent", a case where surging occurred to only a small extent, breakage of the strand was not observed, and the pellets could be formed was evaluated as "Good", a case where surging occurred to only a small extent, the strand partially and irregularly broke, but the polymer could be continuously extruded was evaluated as "Fair", and a case where surging occurred and the strand broke immediately after extrusion so that the polymer could not be continuously extruded was evaluated as "Bad".

(2) Appearance

The thermoplastic resin composition was injection-molded to obtain a tabular molded article (specimen) having dimensions of 250×900×3.2 mm. The appearance of the molded article was evaluated by visual observation. A case where the molded article was glossy and surface non-uniformity and separation (peeling) were not observed was evaluated as "Excellent", a case where surface non-uniformity and separation were not observed was evaluated as "Good", a case where surface non-uniformity occurred to only a small extent and separation was not observed was evaluated as "Fair", and a case where surface non-uniformity and separation were observed was evaluated as "Bad".

(3) Impact Resistance

The IZOD impact strength ($kJ/m^2$) of a notched specimen at 23° C. was measured in accordance with JIS K 7110. A case where the IZOD impact strength of the specimen was 5.0 $kJ/m^2$ or more was evaluated as "Good", and a case where the IZOD impact strength of the specimen was less than 5.0 $kJ/m^2$ was evaluated as "Bad".

(4) Ductility

The ductility of the thermoplastic resin composition was evaluated by observing whether or not the thermoplastic resin composition subjected to a weight-drop impact strength test exhibited ductility. The weight-drop impact strength test was conducted at 23° C. in accordance with JIS K 7211, and the puncture properties of a specimen were checked with the naked eye. A case where the specimen exhibited ductility was evaluated as "Good", and a case where the specimen exhibited brittleness was evaluated as "Bad".

(5) Elongation at Break

The elongation at break of the thermoplastic resin composition was measured to evaluate the ductility of the thermoplastic resin composition. The elongation at break (%) of the thermoplastic resin composition was measured at a temperature of 23° C. and a tensile rate of 50 mm/min in accordance with JIS K 7113. A case where the elongation at break was 100% or more was evaluated as "Excellent", a case where the elongation at break was 20% or more was evaluated as "Good", and a case where the elongation at break was less than 20% was evaluated as "Bad".

(6) Heat Resistance

The Vicat softening temperature of the thermoplastic resin composition was measured in accordance with JIS K 7206. A case where the Vicat softening temperature was 100° C. or more was evaluated as "Excellent", a case where the Vicat softening temperature was 70° C. or more was evaluated as "Good", and a case where the Vicat softening temperature was less than 70° C. was evaluated as "Bad".

EVALUATION RESULTS

The thermoplastic resin compositions of Examples 1 to 10 showed excellent results for all of the evaluation items. In particular, the thermoplastic resin compositions of Examples 4, 9, and 10 in which the content of the component (ii) (polyolefin) was relatively high (70 parts by mass) showed superior moldability, appearance, and heat resistance. The thermoplastic resin compositions of Examples 3 and 7 in which the content of the component (i) (polylactic acid) was relatively high (70 parts by mass) showed superior moldability and appearance due to the component (iii-2-1) (epoxy group-containing olefin polymer) and the component (iii-2-2) (acid anhydride group-containing olefin polymer) used as the component (iii-2) (functional group-containing olefin polymer).

The thermoplastic resin compositions of Comparative Examples 4, 6, 9, 10, 12, and 13 in which the component (iii-1) (functional group-containing hydrogenated diene polymer) was used showed improved moldability, appearance, impact resistance, and ductility as compared with the thermoplastic resin compositions of Comparative Examples 1, 2, 3, 5, 7, 8, and 11 in which the component (iii-1) was not used. However, the thermoplastic resin compositions of Comparative Examples 4, 6, 9, 10, 12, and 13 showed inferior moldability, appearance, impact resistance, and ductility as compared with the thermoplastic resin compositions of Examples 1 to 10. The thermoplastic resin compositions of Comparative Examples 1, 2, 3, 5, 7, 8, and 11 showed poor moldability and/or appearance.

INDUSTRIAL APPLICABILITY

Since the thermoplastic resin composition according to the present invention exhibits excellent impact resistance, excellent tear strength, and fluidity appropriate for molding, the thermoplastic resin composition according to the present invention may be used for various industrial products such as a food package, a tray, a sheet, a tube, a film, a garbage bag, a packing bag, a fiber, a laminate, a coating material, an electric/electronic component (e.g., connector, printed circuit board, motor cover, and bulb socket cover), a housing of an office automation apparatus (e.g., computer) and a consumer electrical appliance or automotive component (e.g., injection coil cover, engine cover, and wheel cover), a precision component, an engineering/construction material (e.g., window frame (sash)), and domestic miscellaneous goods (e.g., hanger, chair, and garbage box). In particular, the thermoplastic resin composition according to the present invention may be suitably used for a food package, a tray, a film, a garbage bag, and a packing bag for which ductility, impact resistance, and moldability are required.

The invention claimed is:

1. A thermoplastic resin composition comprising 1 to 30 parts by mass of (i) a polylactic acid, 70 to 99 parts by mass of (ii) a polyolefin consisting of olefin-derived units, and 0.1 to 30 parts by mass of (iii) a compatibilizer based on 100 parts by mass of the components (i) and (ii) in total, wherein the compatibilizer comprises
   (iii-1) a functional group-containing hydrogenated diene polymer that comprises at least one amino functional group, and
   (iii-2) a functional group-containing olefin polymer that comprises at least one functional group selected from an acid anhydride group and an epoxy group.

2. The thermoplastic resin composition according to claim 1, wherein the component (ii) being (ii-1) polypropylene, and the component (iii-1) being a functional group-containing hydrogenated diene polymer that comprises a conjugated diene copolymer as a base polymer, the conjugated diene copolymer comprising a polymer block A and a polymer block B, the polymer block A and the polymer block B being bonded so as to form an (A)-(B)-(A) structure or an [(A)-(B)]$_x$-Y structure, wherein x represents an integer equal to or larger than two, and Y represents a coupling agent residue, and wherein
   the functional group being introduced into the base polymer, and at least 80% of double bonds of conjugated diene compound units that form the base polymer being hydrogenated, the polymer block A being a polymer block that comprises aromatic vinyl compound units in an amount of 50 mass % or more, the polymer block B being a polymer block that comprises conjugated diene compound units in an amount of 50 mass % or more and has a total content of 1,2-bonds and 3,4-bonds of 30 to 90%.

3. The thermoplastic resin composition according to claim 1, wherein the component (ii) being (ii-2) polyethylene, and the component (iii-1) being a functional group-containing hydrogenated diene polymer that comprises a conjugated diene copolymer as a base polymer, the conjugated diene copolymer comprising a polymer block A, a polymer block B, and a polymer block C, the polymer block A, the polymer block B, and the polymer block C being bonded so as to form an (A)-(B)-(C) structure or an $[(A)-(B)-(C)]_x$-Y structure, wherein x represents an integer equal to or larger than two, and Y represents a coupling agent residue, and wherein the functional group being introduced into the base polymer, and at least 80% of double bonds of conjugated diene compound units that form the base polymer being hydrogenated, the polymer block A being a polymer block that comprises aromatic vinyl compound units in an amount of 50 mass % or more, the polymer block B being a polymer block that comprises conjugated diene compound units in an amount of 50 mass % or more and has a total content of 1,2-bonds and 3,4-bonds of 30 to 90%, and the polymer block C being a polymer block that comprises conjugated diene compound units in an amount of 50 mass % or more and has a total content of 1,2-bonds and 3,4-bonds of less than 30%.

4. A molded article comprising the thermoplastic resin composition according to claim 1.

5. A molded article comprising the thermoplastic resin composition according to claim 2.

6. A molded article comprising the thermoplastic resin composition according to claim 3.

7. The thermoplastic resin composition according to claim 1, wherein the component (iii-2) is (iii-2-1) an epoxy group-containing olefin polymer.

8. The thermoplastic resin composition according to claim 1, wherein the component (iii-2) is (iii-2-2) an acid anhydride group-containing olefin polymer.

9. The thermoplastic resin composition according to claim 1, wherein the compatibilizer comprises (iii-2-1) an epoxy group-containing olefin polymer and (iii-2-2) an acid anhydride group-containing olefin polymer as the component (iii-2).

10. The thermoplastic resin composition according to claim 1, wherein the amino functional group is a primary amino group.

11. The thermoplastic resin composition according to claim 1, wherein component (iii) is present in an amount of 0.5 to 20 parts by mass based on 100 parts by mass of the components (i) and (ii) in total.

12. The thermoplastic resin composition according to claim 1, wherein component (iii-1) is present in an amount of 0.1 to 19.9 parts by mass based on 100 parts by mass of the components (i) and (ii) in total.

13. The thermoplastic resin composition according to claim 1, wherein component (iii-2) is present in an amount of 0.1 to 19.9 parts by mass based on 100 parts by mass of the components (i) and (ii) in total.

14. The thermoplastic resin composition according to claim 1, wherein the functional group-containing hydrogenated diene polymer is obtained by subjecting a conjugated diene compound alone to homopolymerization or a conjugated diene compound and an aromatic vinyl compound to block copolymerization in the presence of an organic alkali metal compound that has an amino group and is shown by the following general formula (3) or (4), and hydrogenating the copolymer:

(3)

wherein $R^3$ and $R^4$ represent trialkylsilyl groups having 3 to 18 carbon atoms, or one of $R^3$ and $R^4$ represents a trialkylsilyl group having 3 to 18 carbon atoms and the other of $R^3$ and $R^4$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, and $R^5$ represents an alkylene group or an alkylidene group having 1 to 20 carbon atoms,

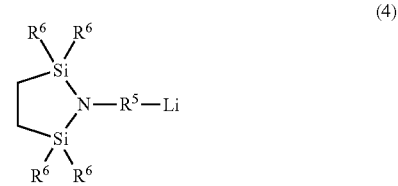

(4)

wherein $R^5$ represents an alkylene group or an alkylidene group having 1 to 20 carbon atoms, and $R^6$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms.

15. The thermoplastic resin composition according to claim 1, wherein the functional group-containing hydrogenated diene polymer is obtained by subjecting a conjugated diene compound alone to homopolymerization or a conjugated diene compound and an aromatic vinyl compound to block copolymerization in the presence of an unsaturated monomer that has an amino group and is shown by the following general formula (5) or (6) and an organic alkali metal compound, and hydrogenating the copolymer:

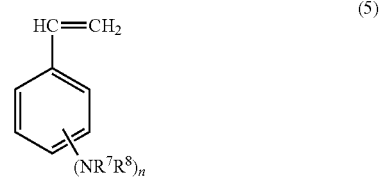

(5)

wherein $R^7$ and $R^8$ represent trialkylsilyl groups having 3 to 18 carbon atoms, or one of $R^7$ and $R^8$ represents a trialkylsilyl group having 3 to 18 carbon atoms and the other of $R^7$ and $R^8$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, and n represents an integer from 1 to 3,

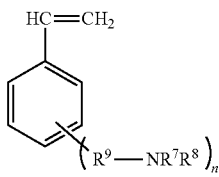

(6)

wherein $R^7$ and $R^8$ represent trialkylsilyl groups having 3 to 18 carbon atoms, or one of $R^7$ and $R^8$ represents a trialkylsilyl group having 3 to 18 carbon atoms and the other of $R^7$ and $R^8$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, $R^9$ represents an alkylene group having 1 to 20 carbon atoms, and n represents an integer from 1 to 3.

16. The thermoplastic resin composition according to claim 1, wherein the functional group-containing hydrogenated diene polymer is obtained by subjecting a conjugated diene compound alone to homopolymerization or a conjugated diene compound and an aromatic vinyl compound to block copolymerization in the presence of an organic alkali metal compound, allowing the active site of the copolymer to react with an alkoxysilane compound shown by the following general formula (7), and hydrogenating the resulting polymer:

$$R^{10}{}_{(4-m-n)}Si(OR^{11})_m X_n \qquad (7)$$

wherein $R^{10}$ represents an alkyl group having 1 to 20 carbon atoms, an aryl group having 6 to 20 carbon atoms, an aralkyl group having 7 to 20 carbon atoms, or an organosiloxy group having 1 to 100 carbon atoms, and when the alkoxysilane compound contains two or more $R^{10}$s, the $R^{10}$s may be identical or different functional groups; $R^{11}$ represents an alkyl group having 1 to 20 carbon atoms, an aryl group having 6 to 20 carbon atoms, or an aralkyl group having 7 to 20 carbon atoms, and when the alkoxysilane compound contains two or more $OR^{11}$ groups, the $R^{11}$s may be identical or different functional groups; X represents a substituent having a polar group containing a nitrogen atom, and when the alkoxysilane compound contains two or more Xs, the Xs may be identical or different functional groups, and wherein the Xs may be independent substituents, or may form a cyclic structure; m and n represent integers from 1 to 3, and the sum of m and n is an integer from 1 to 4.

17. The thermoplastic resin composition according to claim 1, wherein the component (iii-2) is an ethylene-glycidyl methacrylate copolymer.

18. The thermoplastic resin composition according to claim 13, wherein the component (iii-2) is an ethylene-glycidyl methacrylate copolymer.

* * * * *